(12) United States Patent
Brokish

(10) Patent No.: US 7,500,130 B2
(45) Date of Patent: Mar. 3, 2009

(54) CYCLE-ACCURATE REAL-TIME CLOCKS AND METHODS TO OPERATE THE SAME

(75) Inventor: Charles W. Brokish, Poynette, WI (US)

(73) Assignee: Texas Instruments Incorporated, Dallas, TX (US)

( * ) Notice: Subject to any disclaimer, the term of this patent is extended or adjusted under 35 U.S.C. 154(b) by 363 days.

(21) Appl. No.: 11/333,017

(22) Filed: Jan. 17, 2006

(65) Prior Publication Data

US 2007/0168687 A1   Jul. 19, 2007

(51) Int. Cl.
  *G06F 1/04* (2006.01)
  *G06F 1/14* (2006.01)
(52) U.S. Cl. .................. 713/502; 713/500; 713/501; 713/503
(58) Field of Classification Search .............. 713/500, 713/501, 502, 503
  See application file for complete search history.

(56) References Cited

U.S. PATENT DOCUMENTS

| 4,232,548 | A | * | 11/1980 | Baumoel | ............... | 73/861.28 |
| 5,062,142 | A | * | 10/1991 | Meckley | ............... | 382/259 |
| 5,151,642 | A | * | 9/1992 | Lombardi et al. | ........... | 318/779 |
| 6,665,367 | B1 | * | 12/2003 | Blair | ........................ | 377/20 |

* cited by examiner

*Primary Examiner*—Thomas Lee
*Assistant Examiner*—Jaweed A Abbaszadeh
(74) *Attorney, Agent, or Firm*—Ronald O. Neerings; Wade James Brady, III; Frederick J. Telecky, Jr.

(57) ABSTRACT

Cycle-accurate real-time clocks and methods to operate the same are disclosed. An example real-time clock comprises a first counter to count cycles of a selectively-operable clock, a multiplexer to select from at least an output signal associated with the first counter or a continuously-operating clock, and a second counter to count cycles of an output signal of the multiplexer.

26 Claims, 4 Drawing Sheets

# CYCLE-ACCURATE REAL-TIME CLOCKS AND METHODS TO OPERATE THE SAME

FIELD OF THE DISCLOSURE

This disclosure relates generally to real-time clocks and, more particularly, to cycle-accurate real-time clocks and methods to operate the same.

BACKGROUND

The debugging of real-time software applications often involves the recordation (e.g., logging) of events and corresponding timestamps. For example, a time difference between two timestamps corresponding to two events may be used to determine the execution time of a task, a subroutine, an interrupt service routine, etc. For the highest accuracy and the most insight into the behavior of the software, the timestamps are preferably cycle-accurate. That is, the timestamps have a time resolution no greater than the cycle time of the clock of the processor operating the real-time software.

However, in many low-power applications such as, for example, a battery operated cellular telephone, a processor may selectively power-down the processor and the processor's clock. In such circumstances, a time difference between two events may not be determinable and/or may be inaccurate. For example, consider a timeline wherein a first event is logged, the processor's clock is powered down, the processor's clock is subsequently restarted, and the processor then logs a second event. Since, the clock was powered down between the first and the second events, the time that elapsed between the first and the second events is not accurately reflected and/or captured by the processor's clock.

DETAILED DESCRIPTION

Cycle-accurate real-time clocks and methods to operate the same are disclosed. A disclosed example real-time clock comprises a first counter to count cycles of a selectively-operable clock, a multiplexer to select from at least an output signal associated with the first counter or a continuously-operating clock, and a second counter to count cycles of an output signal of the multiplexer. A disclosed example method comprises configuring a real-time clock to operate one or more of a selectively-operable clock or a continuously-operating clock, and accessing an interface of the real-time clock to configure an output of the real-time clock to represent an entire real-time clock output, a first portion of the real-time clock output, a second portion of the real-time clock output, or a value computed from the first and the second portions.

Figure 1:
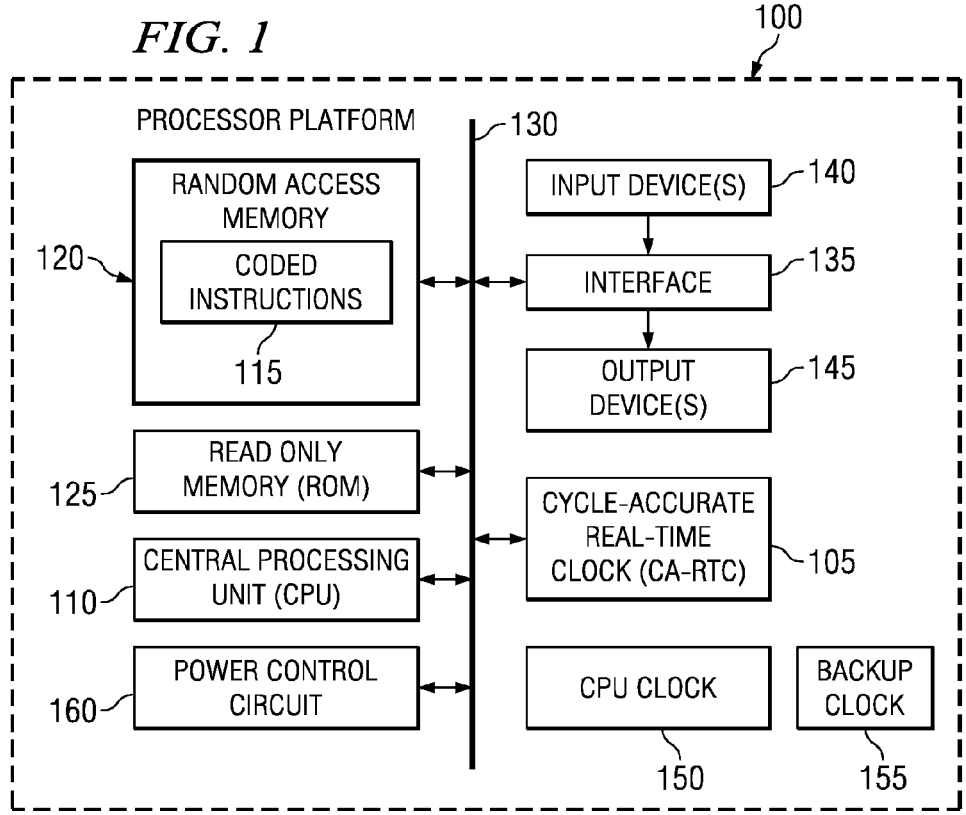
FIG. 1 is a schematic illustration of an example processor platform.

FIG. 1 is a schematic diagram of an example processor platform 100 incorporating an example cycle-accurate real-time clock (CA-RTC) 105. Among other things, the example platform 100 may be used and/or programmed to operate and/or utilize the example CA-RTC 105 by, for instance, executing the example machine readable instructions illustrated in FIG. 5. For example, the processor platform 100 can be implemented by one or more general purpose and/or customized microprocessors, microcontrollers, digital signal processors (DSPs), etc., and may be used to realize, for example, a cellular telephone, a portable media device, a portable wireless device (e.g., a personal digital assistant (PDA)), etc.

The processor platform 100 of the example of FIG. 1 includes a central processing unit (CPU) 110. The CPU 110 executes coded instructions 115 present in main memory of the processor 110 (e.g., within a random access memory (RAM) 120). The CPU 110 may be any type of processing unit, such as a DSP and/or DSP core from Texas Instruments®, an advanced reduced instruction set computing (RISC) machine (ARM) processor, or any of a variety of microprocessor, etc. The CPU 110 may execute, among other things, the example machine readable instructions of FIG. 5 to operate and/or utilize the example CA-RTC 105.

The CPU 110 is in communication with the main memory (including a read only memory (ROM) 125 and the RAM 120) via a bus 130. The RAM 120 may be implemented by dynamic random access memory (DRAM), Synchronous DRAM (SDRAM), and/or any other type of RAM device. The ROM 125 may be implemented by flash memory and/or any other desired type of memory device. Access to the memory 120 and 125 is typically controlled by a memory controller (not shown) in a conventional manner.

The processor platform 100 also includes a conventional interface circuit 135. The interface circuit 135 may be implemented by any type of well-known interface standard, such as an external memory interface, serial port, general purpose input/output, etc. One or more input devices 140 and one or more output devices 145 may be connected to the interface circuit 135, depending on the desired application of the device. An example input device 140 is an analog-to-digital converter (ADC) and an example output devices 145 is a digital-to-analog converter (DAC).

To provide a clock upon which the example processor platform 100 operates, the illustrated example includes a selectively-operable CPU clock 150. In the illustrated example of FIG. 1, the CPU clock 150 is used to clock, among other things, the CPU 110, the interface 135 and/or one or more of the input devices 140 and/or the output devices 145.

As discussed below in connection with FIG. 2, the CA-RTC 105 utilizes the selectively-operable CPU clock 150 and/or a continuously-operating backup clock 155 to determine and/or maintain real-time information. In particular, the CA-RTC 105 may be configured by the CPU 110 and/or a conventional power-control circuit 160 to operate in a variety of modes as discussed below in connection with FIGS. 2-5.

In the illustrated example, the continuously-operating backup clock 155 operates at a frequency of 32 thousand cycles per second (kHz) and the selectively-operable CPU clock 150 operates at a substantially higher frequency (e.g., 100 million cycles per second (MHz)). In the illustrated example of FIG. 1, the selectively-operable CPU clock 150 may operate at a multiplicity of frequencies selected and/or controlled by the CPU 110 and/or the power control circuit 160. For instance, the CPU 110 may enter a sleep mode (i.e., low power consumption state) when the power control circuit 160 (which may be implemented using any of a variety of techniques) disables the selectively-operable CPU clock 150 (i.e., the CPU clock 150 operates at a frequency of zero cycles per second (Hz)). In such a mode, the CPU 110 and/or the power control circuit 160 of the illustrated example re-configures the CA-RTC 105 to operate using only the continuously-operating backup clock 155. Typically, the CPU clock 150 will meet tighter manufacturing tolerances (i.e., be more accurate) than the backup clock 155.

In the illustrated example of FIG. 1, the CPU 110 may, as discussed below in connection with FIGS. 2-5, access the CA-RTC 105 in any of a variety of ways such as, for example, via different access addresses to determine the form and/or type of result output by the CA-RTC 105. For instance, in the example of FIG. 1, a message or access to a first address results in the CA-RTC 105 outputting a timestamp in milliseconds, an access to a second address results in the CA-RTC 105 outputting a short term CPU cycle count, an access to a third address results in the CA-RTC 105 outputting a cycle-accurate timestamp, an access to a fourth address results in the CA-RTC 105 outputting a raw (i.e., un-processed) real-time information and/or data, a clock gauge value, etc. The example CA-RTC 105 is, thus, configurable to operate with one or both of the selectively-operable CPU clock 150 and the continuously-operating backup clock 155, and to respond to one or more requests by automatically providing one ore more of a variety of real-time and/or timestamp information to the CPU 110.

In the illustrated example, the example CA-RTC 105 maintains real-time information even when the CPU 110 and the selectively-operable CPU clock 150 are disabled, and maintains and/or provides cycle-accurate real-time information when the CPU 110 is operating. In the illustrated example of FIG. 1, the CA-RTC 105 and the backup clock 155 are continuously powered (i.e., operational) and, thus, the CA-RTC 105 continuously maintains real-time information for the example platform 100.

Figure 2:
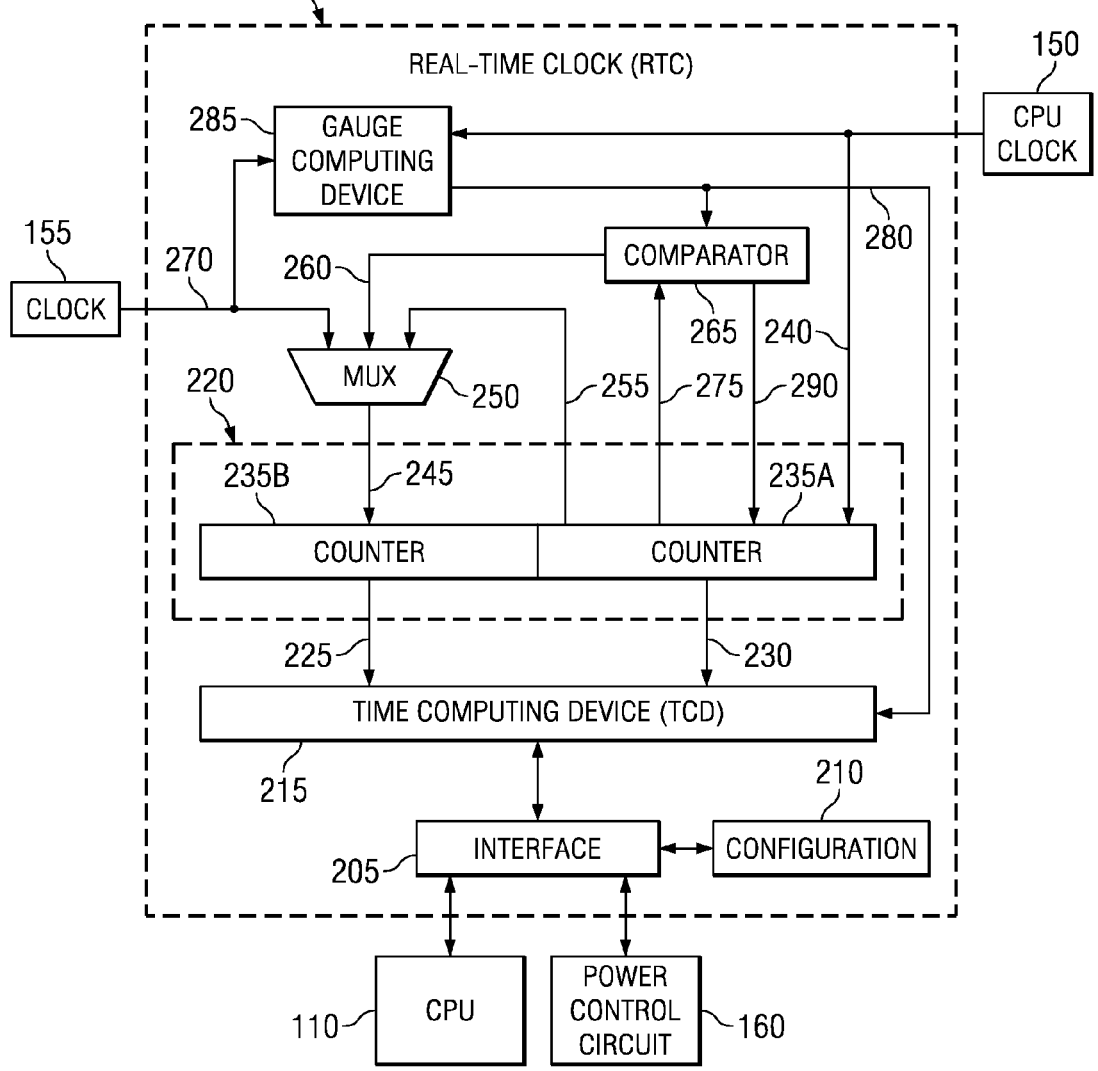
FIG. 2 is a schematic illustration of an example cycle-accurate real-time clock (CA-RTC) constructed in accordance with the teachings of the invention.

FIG. 2 illustrates an example manner of implementing the example CA-RTC 105 of FIG. 1. To allow the CPU 110 to configure the CA-RTC 105 and/or to access real-time information maintained by the CA-RTC 105, the example CA-RTC 105 includes an interface 205. The interface 205 may be implemented using any of a variety of techniques such as, for example, memory-mapped access to data registers implemented by the CA-RTC 105.

Configuration data and/or parameters provided by the CPU 10 and/or the power control circuit 160 are stored in one or more conventionally implemented configuration register(s) 210. As discussed below, data stored in the configuration register(s) 210 may be used to configure, operate and/or utilize the example CA-RTC 105 illustrated in FIG. 2. For example, one or more bits of the configuration register(s) 210 may be used, as described below, to control one or more multiplexers.

To determine cycle-accurate real-time information, the illustrated CA-RTC 105 includes a time computing device (TCD) 215. In the illustrated example, the TCD 215 determines cycle-accurate real-time information from one or more outputs (e.g., outputs 225 and 230) of a counter 220. An example TCD 215 is illustrated and discussed below in connection with FIG. 3.

In the illustrated example of FIG. 2, the counter 220 is comprised of two counters 235A and 235B. The counters 220, 235A and 235B of the illustrated example are implemented as registers, wherein the registers implementing the counters 235A and 235B are each a portion of the register implementing the counter 220. The counter 235A is incremented based upon an output 240 of the selectively-operable CPU clock 150 (i.e., clock signal 240). For instance, the counter 235A is incremented on each rising edge of the clock signal 240.

In the example of FIG. 2, the counter 235B is incremented based upon an output signal 245 from a multiplexer 250 and is, for example, incremented on each rising edge of the signal 245. The multiplexer 250 is responsive to the configuration register(s) 210 to output either a roll-over output 255 of the counter 235A, an output 260 of a comparator 265, or an output 270 of the continuously-operating backup clock 155 (i.e., a clock signal 270). An example roll-over output signal 255 has a rising edge whenever the counter 235A rolls-over, that is, whenever the counter 235A exceeds the maximum value that the counter 235A can represent and the counter 235A returns to a value of zero and continues counting.

In another example, the current value 275 of the counter 235A is provided to the comparator 265 which compares the current value 275 with a clock gauge value 280 provided by a gauge computing device 285. When the current value 275 exceeds the clock gauge value 280, the comparator 265 sends a reset signal 290 to the counter 235A and outputs a rising edge on the signal 260 to the multiplexer 250. In response to the reset signal 290, the counter 235A is reset to a value of zero.

To determine the clock gauge value 280, the example CA-RTC 105 of FIG. 2 includes the gauge computing device 285. The gauge computing device 285 determines a ratio (i.e., the clock gauge value 280) of the frequency of the CPU clock 150 to the frequency of the backup clock 155. For example, the gauge computing device 285 computes the number of rising edges of the clock signal 240 per each rising edge of the clock signal 270. The gauge computing device 285 may, optionally, use multiple rising edges of the clock signal 270 to improve the accuracy of the clock gauge value 280. In the illustrated examples of FIGS. 1 and 2, the selectively-operable CPU clock 150 may operate at different frequencies and, thus, the gauge computing device 285 periodically re-determines the clock gauge value 280. This re-determination can be performed at fixed intervals or in response to an event such as a detected change in the frequency of the CPU clock 150.

As illustrated in FIG. 2, the counter 220 comprises the two counters 235B and 235A. The counter 235A represents the lower bits of the counter 220 and the counter 235B represents the upper bits of the counter 220. Unless, the selectively-operable CPU clock 150 is disabled, the counter 220 represents both high-precision (i.e., cycle-accurate) real-time information and lower-precision real-time information. In particular, the counter 235A represents the cycle-accurate (i.e., higher frequency) portion of the counter 220 and the counter 235B represents the continuously-operating and lower frequency portion of the counter 220.

Depending upon the input selected by the multiplexer 250 (e.g., one of the clock signal 270, the comparator output 260 or the roll-over output 255 of the counter 235A) and upon the enabling of the comparator 265, the example CA-RTC 105 of FIG. 2 can implement a variety of cycle-accurate real-time clocks. In general, the counter 235A counts rising edges of the clock signal 240. If the comparator 265 is disabled, the counter 235A counts up to the maximum value of the counter 235A as determined by the number of bits used to implement the counter 235A and then rolls-over to a value of zero. Alternatively, if the comparator 265 is enabled, the counter 235A counts up to the clock gauge value 280 and is then reset to a value of zero.

In a first example configuration, the multiplexer 250 selects the clock signal 270 and the comparator 265 is disabled. Thus, the counter 235B counts rising edges of the clock signal 270. In this example, the counters 235A and 235B operate independently and, if the clock signals 240 and 270 are synchronized (i.e., if there are 2^N rising edges of the clock signal 240 for each rising edge of the clock signal 270, wherein N is the number of bits used to implement the counter 235A), the counter 220 directly represents cycle-accurate real-time information. In general, however, the clock signals 240 and 270 will not be synchronized, that is, there may be more or less than 2^N rising edges of the clock signal 240 for each rising edge of the clock signal 270.

In a second example configuration, the multiplexer 250 selects the roll-over output signal 255 from the counter 235A and the comparator 265 is disabled. Thus, the counters 235A and 235B collectively count rising edges of the clock signal 240.

In a third example configuration, the comparator 265 is enabled and the multiplexer 250 selects the output 260 of the comparator 265 to implement a more synchronized CA-RTC 105. In particular, because the comparator is enabled, the counter 235B counts gauge periods of the clock signal 240 and the counter 235A is reset at each gauge period boundary. That is, there are clock gauge value 280 rising edges of the clock signal 240 for each rising edge of the clock signal 270. As such, the counter 235A reflects equal portions of each rising edge counted by the counter 235B. However, since the clock gauge value 280 does not necessarily have a value that is an integer power of 2 (e.g., 2^4), the TCD 215 of the illustrated example may perform computations to obtain a digital value that represents a cycle-accurate real-time value from the counter 220. In particular, the example TCD 215 of FIG. 2 may multiply the current value 225 of the counter 235B by the clock gauge value 280 and then add the current value 230 of the counter 235A to obtain the current time. The current time may be mathematically expressed, for instance, as shown in EQN. 1, where Counter(upper) represents the value 225 of the counter 235B, Gauge represents the clock gauge value 280, and Counter(lower) represents the value 230 of the counter 235A.

$$\text{TIME} = \text{Counter(upper)} * \text{Gauge} + \text{Counter(lower)} \quad \text{EQN. 1}$$

Alternatively, the CPU 110 may obtain the value of the counter 220 without the TCD 215 making any computations. For example, the CPU 110 may read the counter 220 and compute the current time using, for example, the mathematical function expressed shown in EQN. 1.

In the second and third example configurations, the counter 235A is used to clock the counter 235B. Thus, in the illustrated example of FIG. 1, if the selectively-operable CPU clock 150 is powered-down, the multiplexer 250 is re-configured to use the clock signal 270 to clock the counter 235B. That is, when the CPU clock 150 is not available, the clock signal 270 is used by the CA-RTC 105 to maintain the real-time information. While the CPU clock 150 is disabled, the counter 235A is not updated and, thus, high frequency updates are not currently reflected in the counter 220. When the CPU clock 150 is re-enabled, the multiplexer 250 can again be re-configured to select either the roll-over signal 255 or the comparator output signal 260 (e.g., to configure the CA-RTC 105 as in the second or third examples above). In a re-configuration example, the CPU clock 150 is disabled at time instants corresponding to rising edges of the signal 245 and the CPU clock 150 is likewise re-enabled at rising edges of the clock signal 270 so that the two counters 235A and 235B remain synchronized.

While not shown in FIG. 2, it will be readily apparent to persons of ordinary skill in the art that when the selectively-operable CPU clock 150 is re-enabled, the counter 235B may optionally be adjusted to correct for differences between the backup clock 155 and the CPU clock 150. For example, if the clock signal 270 is not synchronized to the clock signal 240, then while the clock signal 240 is turned off the counter 235B may run slower or faster than desired. In the illustrated example, the clock gauge value 280 may be used to adjust the counter 235B. For instance, if a nominal clock signal 270 (i.e., for a backup clock 155 operating at the designed frequency with zero tolerance) would result in a nominal clock gauge value, then the counter 235B may be adjusted based upon a difference between the nominal clock gauge value and the actual clock gauge value 280. For example, the counter 235B may be adjusted as mathematically illustrated in EQN. 2.

$$\text{Counter} = \text{Counter} + \left\lfloor \frac{\text{Counter\_diff} * (\text{actual} - \text{nom})}{\text{actual}} \right\rfloor, \quad \text{EQN. 2}$$

where Counter is the current value 225 of the counter 235B, Counter_diff is the difference in the value 225 of the counter 235B at the time the CPU clock 150 is disabled to the value of 225 of the counter 235B at the time the CPU clock 150 is re-enabled, nom is the nominal clock gauge value, actual is the clock gauge value 280 and ⌊ ⌋ represents the conventional mathematical floor operator.

It will be appreciated that when the CPU clock 150 is re-enabled, to achieve synchronization with the counter 235B, the counter 235A may be started at a non-zero value based upon the difference between the nominal clock gauge value and the actual clock gauge 280. For example, the counter 235A may be set based upon the mathematical expression of EQN. 3.

$$\text{Counter\_start} = [\text{Counter\_diff} * (\text{actual} - \text{nom})] \% \text{ actual}, \quad \text{EQN. 3}$$

where Counter is the current value 225 of the counter 235B, Counter_diff is the difference in the value 225 of the counter 235B at the time the CPU clock 150 is disabled to the value 225 of the counter 235B at the time the CPU clock 150 is re-enabled, nom is the nominal clock gauge value, actual is the clock gauge value 280 and % represents the conventional mathematical modulus operator.

Consider an example CPU clock 150 that operates at a frequency that is 101 times the frequency of the backup clock 155 (i.e., at an actual gauge value 280 of 101) as opposed to a nominal ratio of 100 (i.e., nominal clock gauge of 100). That is, the backup clock 155 operates 1% slower than the CPU clock 150 or, equivalently, loses one rising edge of the CPU clock 150 for each rising edge of the backup clock 155. Therefore, if the present example CPU clock 150 is disabled for 400 rising edges of the clock signal 270, then, while the counter 235A was idle, the counter 235B effectively lost 400*(101−100)=400 cycles of CPU clock 150 while the CPU clock 150 was disabled. Thus, the counter 235B could optionally be increased by ⌊400/101⌋=3 and the counter 235A could optionally be set to an initial value of 400% 101=97.

Figure 3:
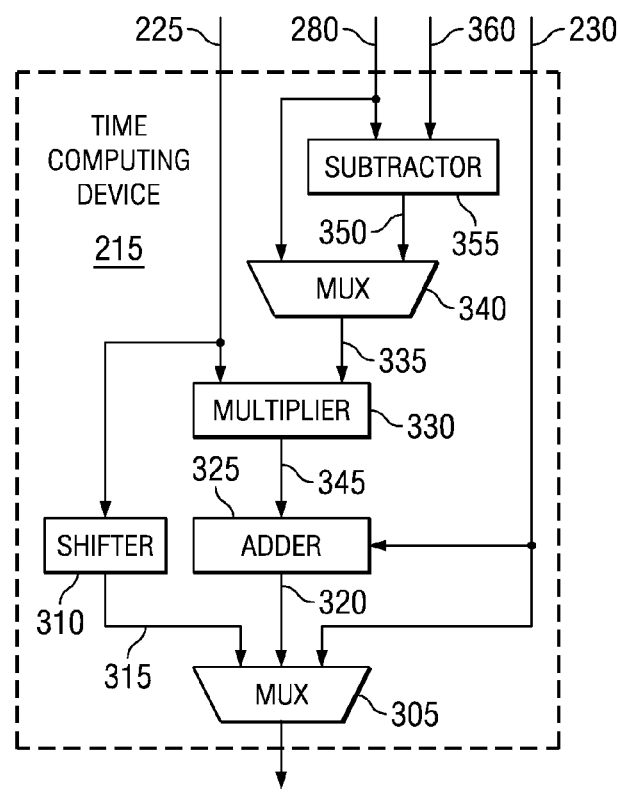
FIG. 3 is a schematic illustration of the example time computing device (TCD) of FIG. 2.

FIG. 3 illustrates an example manner of implementing the example TCD 215 of FIG. 2. To allow the CPU 10 to access cycle-accurate real-time information provided by the CA-RTC 105, the example TCD 215 includes a multiplexer 305 that allows the CPU 10 to obtain a variety of values that may be determined from the counter 220. For example, the multiplexer 305 allows the CPU 110 to obtain the lower bits of the counter 220, that is, the output 230 of the counter 235A.

The multiplexer 305 also allows the CPU 110 to obtain the upper portion of the counter 220 (i.e., the output 225 of the counter 235B) via a shifter 310. In the illustrated example of FIG. 3, the shifter 310 may perform no shift, a right shift, or a left shift of the shifter input 225. The amount of any applied shift may be fixed or selected and/or controlled by the CPU 110 to obtain an output value in desired units of time. For an example backup clock 155 operating at 32 kHz with the shifter 310 implementing a right shift by 5 bits, an output 315 of the shifter 310 represents time in milliseconds.

Further, the multiplexer 305 allows the CPU 110 to obtain an output 320 of an adder 325. In the illustrated example, the adder 325 and a multiplier 330 are used to implement the mathematical expression of EQN. 1 in order to output the current time. In particular, the multiplier 330 may multiply the output 225 of the counter 235B by an output 335 of a multiplexer 340, where the multiplexer 340 is configured to select the clock gauge value 280. The adder 325 then adds the output 345 of the multiplexer 330 to the output 230 of the counter 235A. This example configuration is suitable for use when, for instance, the multiplexer 250 (FIG. 2) is configured to select the output 260 of the comparator 265 (i.e., the third configuration discussed above).

For the second configuration discussed above, that is, the multiplexer 250 is configured to select the roll-over output 255 from the counter 235A and, thus, the counter 220 counts cycles of the CPU clock 150. However, the clock gauge value 280 may have a different value than $2^N$ (where N is the number of bits used to represent the counter 235A). To determine an actual real-time output value, the example TCD 215 of FIG. 3 may adjust for the difference between the clock gauge value 280 and $2^N$. In particular, the multiplexer 340 can be configured to select an output 350 of a subtractor 355. In the illustrated example of FIG. 3, the subtractor 355 computes the difference 350 between a signal 360 and the clock gauge value 280, where the signal 360 has a value of $2^N$.

Figure 4:
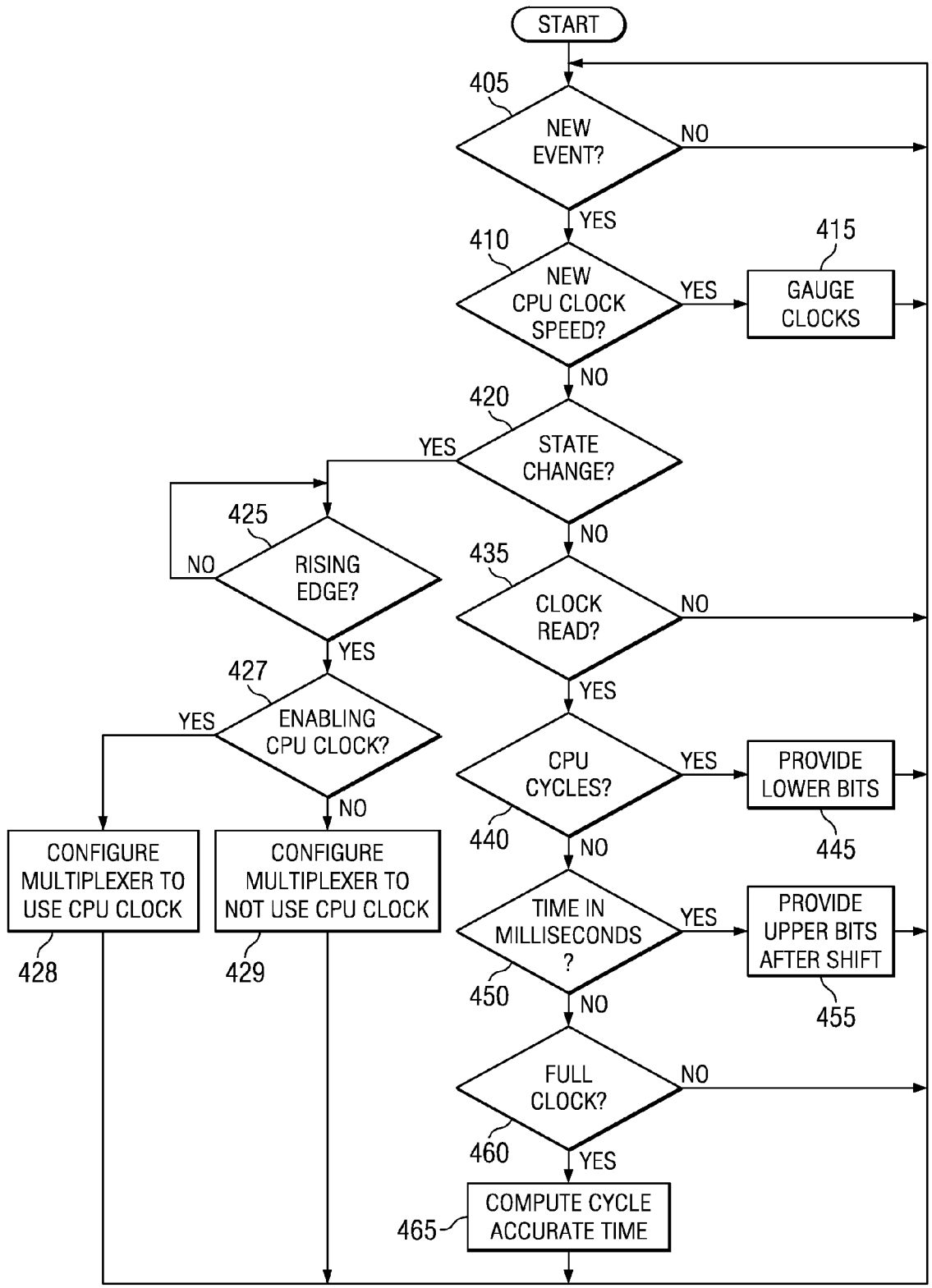
FIG. 4 is a flowchart representative of an example process that may be carried out to implement the example cycle accurate real-time clock of FIG. 2.

FIG. 4 illustrates a flowchart representative of an example process that may be carried out to implement the example CA-RTC 105 of FIGS. 1 and/or 2. The example process of FIG. 4 and/or, more generally, the example CA-RTC 105 may be implemented using an application specific integrated circuit (ASIC), a programmable logic device (PLD), a field programmable logic device (FPLD), discrete logic, hardware, firmware, etc. Alternatively, the example process of FIG. 4 and/or, more generally, the example CA-RTC 105 may be executed by a processor, a controller and/or any other suitable processing device. For example, the example process of FIG. 4 and/or, more generally, the example CA-RTC 105 may be embodied in coded instructions stored on a tangible medium such as a flash memory, or RAM associated with a processor (e.g., the processor 110 shown in the example processor platform 100 and discussed above in conjunction with FIG. 1). Also, some or all of the example process of FIG. 4 and/or, more generally, the example CA-RTC 105 may be implemented manually or as combination(s) of any of the foregoing techniques, for example, a combination of firmware and/or software and hardware. Further, although the example process of FIG. 4 is described with reference to the flowchart of FIG. 4, persons of ordinary skill in the art will readily appreciate that many other methods of implementing the example CA-RTC 105 may be employed. For example, the order of execution of the blocks may be changed, and/or some of the blocks described may be changed, eliminated, sub-divided, or combined. Additionally, persons of ordinary skill in the art will appreciate that the example process of FIG. 4 may be carried out sequentially and/or carried out in parallel by, for example, separate processing threads, devices, circuits, etc.

The example process of FIG. 4 begins, for example, with the CA-RTC 105 waiting to receive a new event such as, for example, a configuration change or a real-time information access by the CPU 110 (block 405). When a new event occurs (block 405), the CA-RTC 105 determines, by, for example, examining the configuration register(s) 210, if the selectively-operable CPU clock 150 has a new non-zero operating frequency (block 410). Alternatively, an appropriate write to the configuration register(s) 210 could indicate to the CA-RTC 105 that the CPU clock 150 has a new non-zero operating frequency (block 410). If the CPU clock 150 has a new non-zero operating frequency (block 410), the gauge computing device 285 computes a new clock gauge value 280 (block 415) and control returns to block 405 to wait another new event.

If the CPU clock 150 does not have a new operating frequency (block 410), the CA-RTC 105 determines, by, for example, examining the configuration register(s) 210, if a state change for the CA-RTC 105 has been configured (block 420). Example state changes are a result of the power control circuit 160 disabling or enabling the selectively-operable CPU clock 150. Alternatively, an appropriate write to the configuration register(s) 210 could indicate to the CA-RTC 105 that a state change is to occur (block 420). Upon receiving a state change configuration (block 420), the CA-RTC 105 waits for a rising edge of the output 245 of the multiplexer 250 (block 425). If the CPU clock 150 is being enabled (block 427), the multiplexer 250 is configured to select the output 260 of the comparator 265 or the roll-over output 255 of the counter 235A depending upon the configuration register(s) 210 (block 428). If the CPU clock 150 is going to be disabled (block 427), the multiplexer 250 is configured to select the clock signal 270 (block 429). Alternatively, the CA-RTC 105 could configure the multiplexer 250 (block 428 or 429) without waiting at block 425 for a rising edge. Control then returns to block 405 to wait for another new event.

Returning to block 420, and assuming there is not change in the state of the clock (block 420), control advances to block 435. If the CPU 110 is accessing the real-time information provided by the CA-RTC 105 (block 435), the CA-RTC 105 determines the type of access (blocks 440, 450 and 460). The type of access may be determined by, for example, an address used by the CPU 110 to access the interface 205. If the CPU 110 is accessing the lower bits of the counter 220 to, for example, determine the number of CPU cycles to complete a short task (block 440), the multiplexer 305 (FIG. 3) selects the output 230 of the counter 235A to provide the lower bits of the counter 220 (block 445). If the CPU 110 wants to read the current time in milliseconds (block 450), the multiplexer 305 selects the shifted output 315 of the shifter 310 (i.e., a portion of the output 225 of the counter 235B such as, for example, the upper bits of the counter 220) (block 455). If the CPU 110 is assessing the full cycle-accurate real-time information (block 460), the multiplexer 325 selects the output 320 of the adder 325 and configures the multiplexer 340 as described above in connection with FIG. 3 (block 465). Control then returns to block 405 to wait for another new event.

Figure 5:
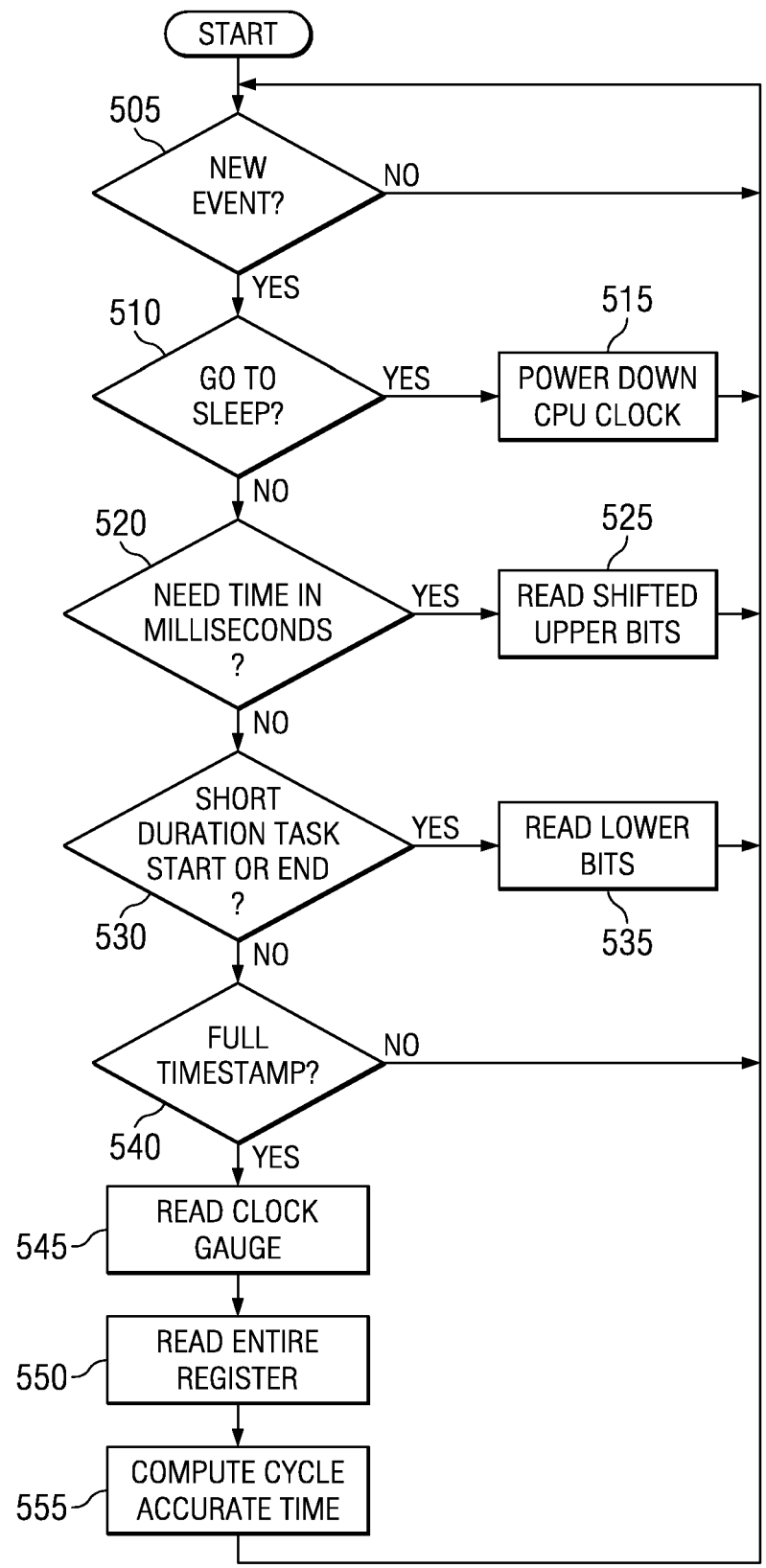
FIG. 5 is a flowchart representative of example machine readable instructions that may be executed to operate the example cycle accurate real-time clock of FIG. 2.

FIG. 5 illustrates a flowchart representative of example machine readable instructions that may be executed to operate and/or utilize the example CA-RTC 105 of FIGS. 1 and/or 2. The example machine readable instructions of FIG. 5 may be executed by a processor, a controller and/or any other suitable processing device. For example, the example machine readable instructions of FIG. 5 may be embodied in coded instructions stored on a tangible medium such as a flash memory, or RAM associated with a processor (e.g., the processor 110 shown in the example processor platform 100 and discussed above in conjunction with FIG. 1). Alternatively, some or all of the example flowchart of FIG. 5 may be implemented using an ASIC, a PLD, a FPLD, discrete logic, hardware, firmware, etc. Also, some or all of the example flowchart of FIG. 5 may be implemented manually or as combination(s) of any of the foregoing techniques, for example, a combination of firmware and/or software and hardware. Further, although the example machine readable instructions of FIG. 5 are described with reference to the flowchart of FIG. 5, persons of ordinary skill in the art will readily appreciate that many other methods of utilizing the example CA-RTC 105 may be employed. For example, the order of execution of the blocks may be changed, and/or some of the blocks described may be changed, eliminated, subdivided, or combined. Additionally, persons of ordinary skill in the art will appreciate that the example machine readable instructions of FIG. 5 may be carried out sequentially and/or carried out in parallel by, for example, separate processing threads, processors, devices, circuits, etc.

The example machine readable instructions of FIG. 5 begin with, for example, the CPU 110 waiting for a new event such as, for instance, a need for a timestamp, a time to go to sleep, etc. (block 505). When a new event occurs (block 505), the CPU 110 determines the type of the new event (blocks 510, 520, 530 and 540).

If the new event (block 505) is a time to go to sleep (i.e., enter a power-down state) (block 510), the CPU 110 instructs, for example, the power control circuit 160 to power-down the selectively-operable CPU clock 150 (block 515). In response to the instruction, the power control circuit 160 configures the CA-RTC 105 as discussed above (e.g., configures the multiplexer 250 to select the clock signal 270 from the continuously operating backup clock 144) and then powers-down the CPU clock 150. Control then returns to block 505 to await another new event.

If the new event (block 505) is to determine a time in milliseconds (block 520), the CPU 110 interacts with the interface 205 to obtain the shifted output 315 (FIG. 3) from the shifter 310 (e.g., the upper bits of the counter 220) (block 525). Control then returns to block 505 to await another new event.

If the new event (block 505) is to determine a timestamp for, e.g., the start or finish of a short-duration task (block 530), the CPU 110 interacts with the interface 205 to obtain the output 230 of the counter 235A (block 535). Control then returns to block 505 to await another new event.

If the new event (block 505) is to obtain a full cycle-accurate timestamp (block 540), the CPU 110 interacts with the interface 205 to obtain the clock gauge value 280 (block 545) and the full contents of the counter 220 (block 550). The CPU 110 then computes a cycle-accurate timestamp by, for example, executing the example mathematical expression shown in EQN. 1 (block 555). Alternatively, the CPU 110 may obtain the cycle accurate time-stamp by accessing the output 325 of the adder 325 (block 555). In the latter approach, blocks 545 and 550 are skipped. Control then returns to block 505 to await another new event.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A real-time clock comprising:
 a first counter to count cycles of a selectively-operable clock;
 a multiplexer to select from at least an output signal associated with the first counter or a continuously-operating clock;
 a second counter to count cycles of an output signal of the multiplexer; and
 a time computing device to determine a cycle accurate time from the first and the second counters, wherein the time computing device comprises:
  a multiplier to multiply an output of the second counter by a scale factor; and
  an adder to add an of the multiplier to an output of the first counter.

2. An apparatus as defined in claim 1, wherein the first counter comprises a first portion of a register and the second counter comprises a second portion of the register.

3. An apparatus as defined in claim 1, further comprising a power control circuit to selectively enable the selectively-operable clock, wherein the power control circuit is responsive to a processor.

4. An apparatus as defined in claim 3, wherein the power control circuit at least one of configures the multiplexer to select the continuously-operating clock, powers down the selectively-operable clock, enables the selectively-operable clock, or configures the multiplexer to select the output signal associated with the first counter.

5. An apparatus as defined in claim 1, wherein the output signal associated with the first counter is at least one of a roll-over output signal from the first counter or an output signal from a comparator.

6. An apparatus as defined in claim 1, further comprising a processor to determine a cycle accurate timestamp from the first and the second counters.

7. An apparatus as defined in claim 1, further comprising a clock gauge computing device to determine an operating frequency ratio associated with the selectively-operable clock and the continuously-operating clock.

8. An apparatus as defined in claim 1, further comprising a comparator to compare an output of the first counter with a clock gauge to generate the output signal associated with the first counter.

9. An apparatus as defined in claim 1, wherein the time computing device further comprises:
 a subtractor;
 a first multiplexer to select from at least a clock gauge or an output of the subtractor;
 a shifter to shift the output of the second counter; and
 a second multiplexer to select from at least an output of the adder, an output of the shifter or the output of the first counter.

10. A method comprising:
 counting cycles of a selectively-operable clock to form a first count;
 counting at least one of cycles of a continuously-operating clock or events in the first count to form a second count;
 multiplying the second count by a scale factor; and
 adding a multiplier output to the first count to form a timestamp.

11. A method as defined in claim 10, counting the events in the first count to form the second count comprises:
 setting the first count to zero; and
 incrementing the second count when the first count rolls over.

12. A method as defined in claim 11, wherein the first count rolls over when the first count exceeds a threshold, wherein the threshold is determined by at least one of a number of bits used to implement the first count or a gauge between the selectively-operable clock and the continuously-operating clock.

13. A method as defined in claim 10, wherein the second count is formed from the events in the first count when the selectively-operable clock is operating.

14. A method as defined in claim 10, wherein the second count is formed from the continuously-operating clock when the selectively-operable clock is not operating.

15. A method as defined in claim 10, further comprising:
recording the first count at a first time;
recording the first count at a second time; and
determining a difference between the first count at the second time and the first count at the first time.

16. A method comprising:
counting cycles of a selectively-operable clock to form a first time count;
counting at least one of cycles of a continuously-operating clock or events in the first count to a form a second count;
combining the first and the second counts to form a single clock output;
counting a number of cycles of the selectively-operable clock for a time period;
counting a number of cycles of the continuously-operating clock for the time period; and
determining a ratio of the numbers to determine a clock gauge.

17. A method comprising:
configuring a real-time clock to operate one or more of a selectively-operable clock or a continuously-operating clock;
accessing a first portion of the real-time clock output, wherein the first portion comprises an upper portion of the real-time clock output;
accessing a second portion of the real-time clock output, wherein the second portion comprises a lower portion of the real-time clock output;
multiplying the first portion by a scale factor; and
adding a product of the multiplication to a value from the second portion.

18. A method as defined in claim 17, wherein configuring the real-time clock comprises configuring the real-time clock to:
operate only the continuously-operating clock; and
power down the selectively-operable clock.

19. A method as defined in claim 17, wherein configuring the real-time clock comprises configuring the real-time clock to:
enable the selectively-operable clock; and
configure the real-time clock to operate the selectively-operable clock and the continuously-operating clock.

20. A method as defined in claim 17, further comprising
accessing an interface of the real-time clock to configure an output of real-time clock to represent an entire real-time clock output, the first portion of the real-time clock output, the second portion of the real-time output, or a value computed from the first 21. A method comprising:
configuring a real-time clock to operate one or more a selectively-operable clock or a continuously-operating clock;
accessing an interface of the real-time clock to configure an output of the real-time clock to represent an entire real-time clock output, a first portion of the real-time clock output, a second portion or the real-time clock output, or a value computed from the first and the second portions, wherein the second portion of the real-time clock output comprises a lower portion of the real-time output;
computing a difference between the second portion of the real-time clock at a first time and the second portion of the real-time clock at a second time.

22. A method comprising:
configuring a real-time clock to operate one or more of a selectively-operable clock or a continuously-operating clock;
accessing an interface of the real-time clock to configure an output of the real-time clock to represent an entire real-time clock output, a first portion of the real-time clock output, a second portion of the real-time clock output, or a value computed from the first and the second portions; and
computing a difference between the value computed from the first and second portion at a first time and the value computed from the first and second portions at a second time.

23. An article of manufacture storing machine readable instructions which, when executed, cause a machine to:
configure a real-time clock to operate one or more of a selectively-operable clock or a continuously-operating clock;
access a first portion of the real-time clock output, wherein the first portion comprises an upper portion of the real-time clock output;
access a second portion of the real-time clock output, wherein the second portion comprises a lower portion of the real-time clock output;
multiply the first portion by a scale factor; and
add a product of the multiplication to a value from the second portion.

24. An article of manufacture as defined in claim 23, wherein the machine readable instructions, when executed, cause the machine to configure the real-time clock to:
operate only the continuously-operating clock; and
power down the selectively-operable clock.

25. An article of manufacture as defined in claim 23, wherein the machine readable instructions, when executed, cause the machine to access an interface of the real-time clock to configure an output of the real-time clock to represent an entire real-time clock output, the first portion of the real-time clock output, the second portion of the real-time clock output, or a value computed from the first and the second portions.

26. An article of manufacture storing machine readable instructions which, when executed, cause a machine to:
configure a real-time clock to operate one or more of a selectively-operable clock or a continuously-operating clock;
access an interface of the real-time clock to configure an output or the real-time clock to represent an entire real-time clock output, a first portion of the real-time clock output, a second portion of the real-time clock output, or a value computed from the first and the second portions; and
to at least one of:
determine a timestamp by accessing the first portion of the real-time clock output, wherein the first portion comprises an upper portion of the real-time clock output;
determine a current cycle count by computing a difference between the second portion of the real-time clock at a first time and the second portion of the real-time clock at a second time; and
compute a difference between the value computed from the first and the second portions at a first time and the value computed from the first and the second portions at a second time.

* * * * *